(12) United States Patent
Yegerlehner et al.

(10) Patent No.: US 8,352,131 B2
(45) Date of Patent: *Jan. 8, 2013

(54) DRAINAGE PLOW CONTROL AND METHOD OF CONTROLLING AN ELEVATION OF A CUTTING EDGE OF A DRAINAGE PLOW

(75) Inventors: James D. Yegerlehner, Kentwood, MI (US); Dennis E. Bell, Terre Haute, IN (US)

(73) Assignee: AG Leader Technology, Inc., Ames, IA (US)

( * ) Notice: Subject to any disclaimer, the term of this patent is extended or adjusted under 35 U.S.C. 154(b) by 12 days.

This patent is subject to a terminal disclaimer.

(21) Appl. No.: 13/307,944

(22) Filed: Nov. 30, 2011

(65) Prior Publication Data

US 2012/0073842 A1    Mar. 29, 2012

Related U.S. Application Data

(63) Continuation of application No. 12/333,725, filed on Dec. 12, 2008, now Pat. No. 8,090,507.

(60) Provisional application No. 61/022,851, filed on Jan. 23, 2008.

(51) Int. Cl.
*A01B 63/111* (2006.01)

(52) U.S. Cl. .............................. 701/50; 172/4; 172/239

(58) Field of Classification Search ............... 172/4, 239; 701/50

See application file for complete search history.

(56) References Cited

U.S. PATENT DOCUMENTS

| | | | |
|---|---|---|---|
| 2,755,721 | A | 7/1956 | Rusconi |
| 4,162,708 | A | 7/1979 | Johnson |
| 4,679,633 | A | 7/1987 | Kauss |
| 5,560,431 | A | 10/1996 | Stratton |
| 6,954,999 | B1 | 10/2005 | Richardson et al. |
| 7,144,191 | B2 | 12/2006 | Kieranen et al. |
| 7,317,977 | B2 | 1/2008 | Matrosov |
| 7,899,598 | B2 | 3/2011 | Woon et al. |
| 8,090,507 | B2 * | 1/2012 | Yegerlehner et al. ........... 701/50 |
| 2008/0087447 | A1 | 4/2008 | Piekutowski |

\* cited by examiner

*Primary Examiner* — Thomas B Will
*Assistant Examiner* — Joel F. Mitchell
(74) *Attorney, Agent, or Firm* — McKee, Voorhees & Sease, P.L.C.

(57) ABSTRACT

A pitch plow and a method of controlling an elevation of a cutting edge of a pitch plow having a frame and a shank that is pivotally mounted to the frame, with the shank defining a cutting edge includes a control system that controls an elevation of the cutting edge. The control system includes a hydraulic control between the shank and the frame to pivotally adjust the shank and an electronic control to control the hydraulic actuator. The electronic control includes a processor and first and second sensors. The processor produces an output that adjusts the hydraulic control in a manner that controls the elevation of the cutting edge. The first sensor may measure GNS location and provides a GNS location input to the processor. The second sensor may measure orientation of said shank and provides a shank orientation input to the processor.

23 Claims, 5 Drawing Sheets

DRAINAGE PLOW CONTROL AND METHOD OF CONTROLLING AN ELEVATION OF A CUTTING EDGE OF A DRAINAGE PLOW

CROSS REFERENCE TO RELATED APPLICATIONS

The present invention is a continuation of U.S. patent application Ser. No. 12/333,725, filed on Dec. 12, 2008, which claims priority from U.S. provisional patent application Ser. No. 61/022,851, filed on Jan. 23, 2008, the disclosures of which are hereby incorporated herein by reference in their entirety.

BACKGROUND OF THE INVENTION

The present invention relates to a control system and method for a pitch plow, also known as a "floating-frame plow," and, in particular, to such system and method for controlling the elevation of the cutting edge of the pitch plow. The invention is illustrated for use with agricultural drainage plows used to install underground flexible pipe, which is often referred to as drainage tile. However, the invention could be applied to a range of applications including installation of underground electrical cable, fiber optic cable, or other forms of flexible pipe.

Drainage plows, which include pitch plows, are most typically employed by farmers for installing underground flexible pipe as a water management strategy to improve yield, drought resistance, and timeliness of access to their fields. A pitch plow is pulled behind a tractor. As the tractor pulls the plow through the ground, the plow temporarily creates a trench into which the flexible pipe is installed. The foremost tip of the plow's implement cuts a subsurface on which flexible pipe is laid. Favorable drainage characteristics depend upon good control of the installed pipe profile's depth and grade.

SUMMARY OF THE INVENTION

The present invention provides a technique for operating a pitch plow that is capable of laying flexible pipe, or the like, at a consistent depth.

A pitch plow and method of controlling an elevation of a cutting edge of a pitch plow, according to an aspect of the invention, includes providing a frame and a shank that is pivotally mounted to the frame. The shank defines the cutting edge. A control system is provided that includes a hydraulic control between the shank and the frame and an electronic control. The hydraulic control is adapted to pivotally adjust the shank with respect to the frame. The electronic control is adapted to control the hydraulic actuator. The electronic control includes first and second sensors. The first sensor is adapted to sense a first parameter from which a first elevation estimate of said cutting edge can be derived. The second sensor is adapted to sense a second parameter from which a second elevation estimate of said cutting edge can be derived. The electronic control determines an actual elevation of the cutting edge by combining the first and second elevation estimates. The electronic control compares the actual elevation with a desired elevation and controls said hydraulic actuator to move the cutting edge toward a desired elevation.

The electronic control may combine first and second elevation estimates according to a weighted function to determine actual elevation. The weighted function tends to apply low-pass filtering to the first elevation estimate and to apply high-pass filtering to the second elevation estimate. The weighted function combines (1−W) times the first elevation estimate and (W) times the second elevation estimate, wherein W is a number between 0 and 1. W may be variable or be a constant. The electronic control may include a probability estimator, the probability estimator performing the weighted function. The probability estimator may be a Kalman filter.

The first sensor may be adapted to measure GNS location and to provide a GNS location input to the electronic control. The GNS receiver may have an accuracy no better than 2 inches and may have an accuracy no better than 5 inches. The second sensor may be adapted to measure orientation of the shank and to provide an orientation input to the electronic control. The second sensor may be an inclination sensor, such as a clinometer.

The electronic control may be adapted to determine a calibration parameter, wherein the calibration parameter defines an orientation of the shank at which the edge does not substantially change elevation. The electronic control may be adapted to determine the calibration parameter plate from the first and second parameters. The electronic control may be adapted to determine the calibration parameter during a calibration procedure prior to operation of the pitch plow. The electronic control may be adapted to repetitively update the calibration parameter during operation of the pitch plow.

The shank may include a shear plate. An edge of the shear plate may define the cutting edge. The first and second parameters may be redundant.

A pitch plow and method of controlling an elevation of a cutting edge of a pitch plow, according to an aspect of the invention, includes providing a frame and a shank that is pivotally mounted to the frame. The shank defines the cutting edge. A control system is provided that includes a hydraulic control between the shank and the frame and an electronic control. The hydraulic control is adapted to pivotally adjust the shank with respect to the frame. The electronic control is adapted to control the hydraulic actuator. The electronic control may include a processor, a first sensor and a second sensor. The first sensor may be adapted to measure GNS location and to provide a GNS location input to the processor. The second sensor may be adapted to measure orientation of the shank and to provide a shank orientation input to the processor. The processor is adapted to produce an output from the inputs that is adapted to adjust the hydraulic control in a manner that controls the elevation of the cutting edge.

These and other objects, advantages and features of this invention will become apparent upon review of the following specification in conjunction with the drawings.

DESCRIPTION OF THE PREFERRED EMBODIMENT

Figure 1:
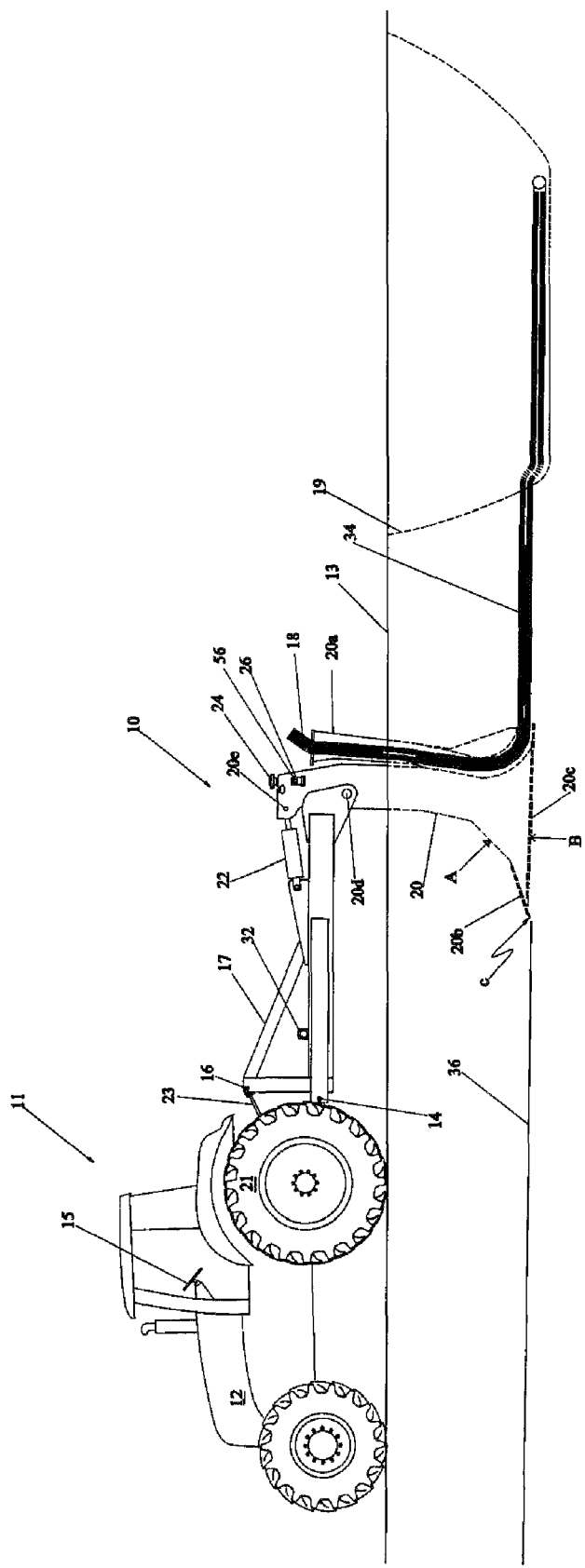
FIG. 1 is a side elevation of a pitch plow assembly according to the invention being pulled by a prime mover.
Figure 2:
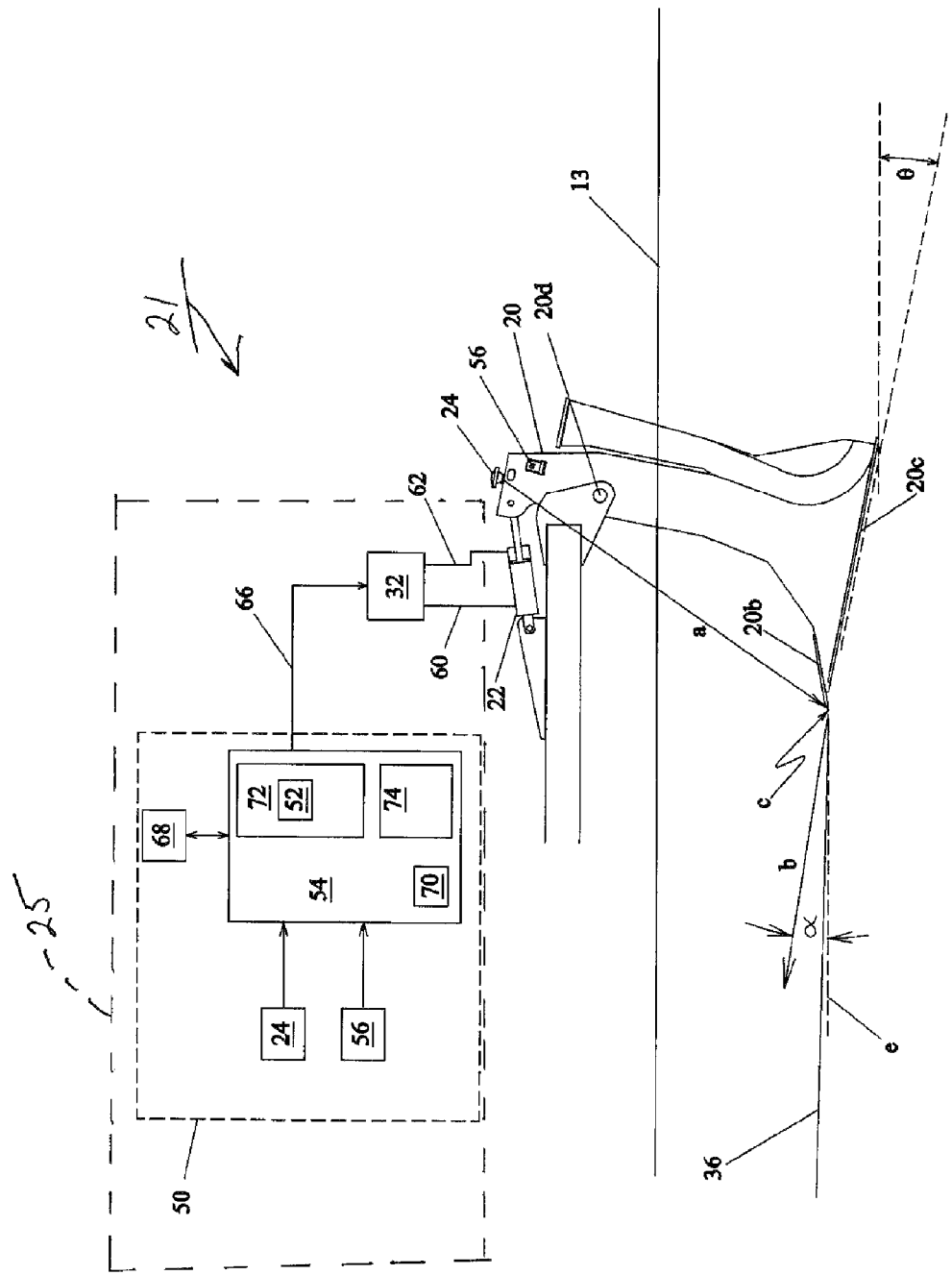
FIG. 2 is a side elevation of the pitch plow assembly illustrated in FIG. 1 including a control system.

Referring now to the drawings, and the illustrative embodiments depicted therein, a pitch plow, such as drainage plow 10, includes a frame 17 and a shank 20 that is pivotally mounted to the frame (FIGS. 1 and 2). The shank defines a forward cutting edge, or shear 20b. A control system 21 is provided that includes a hydraulic control, or actuator, 22 between shank 20 and frame 17 and an electronic control 25. The hydraulic control 22 is adapted to pivotally adjust shank 20 with respect to frame 17. Electronic control 25 is adapted to control hydraulic actuator 22.

A prime mover, such as a tractor 11, propels plow 10. Control of the propulsion and steering of the tractor 11 and its 3-point hitch (not shown) is through a main user interface of the tractor as is conventional. Frame 17 of plow 10 may be coupled to tractor 11 by pins 14 through holes of outer arms (not shown) and a pin 16 through the hole of an upper arm 23 of a conventional 3-point hitch of tractor 11 as is the practice. Alternatively, frame 17 may be coupled to tractor 11 by a drawbar hitch or other known connection techniques. Shank 20 is pivotally attached to frame 17 by a pin 20d. Hydraulic actuator 22 extends and retracts, transmitting force through a pin 20e causing shank 20 to pivot about pin 20d. A skid plate 20c is welded to the bottom of shank 20. The shear 20b is mounted to shank 20 and its tip functions as the plow's cutting edge c. A boot 20a of shank 20 provides a channel through which flexible pipe 18 passes as it is installed by the plow. Electronic control 25 includes an electronic assembly 26 that is mounted to the shank 20 and houses a first sensor 56 which measures a first parameter from which the elevation of cutting edge c can be determined. In the illustrated embodiment, sensor 56 measures the orientation of shank 20 relative to the earth. Electronic control 25 may further include electronics for controlling the solenoids of a hydraulic valve assembly 32 that operates hydraulic actuator 22. A second sensor in the form of a global navigational system (GNS) receiver 24 is mounted to the shank.

To install flexible pipe, the tractor 11 is maneuvered such that it points in the direction in which pipe is to be installed, and the plow 10 is positioned over a trench or ditch 19, as is depicted in FIG. 1. The plow 10 is lowered into the trench 19 using the hydraulically actuated 3-point hitch. The plow being in its lowered position, the 3-point hitch is placed in a floating state. The floating state is known in practice as "turning draft control off." In this state, the hitch allows unconstrained motion of pin 14 and holds pin 16 fixed, leaving plow frame 17 free to pivot about pin 16. An operator feeds flexible pipe or conduit 18 by hand into the top of the boot 20a until the flexible pipe comes out of the bottom of the boot and lies upon the bottom of trench 19. The pipe is anchored in place along the bottom by placing weighty soil upon it or by standing on it. The tractor 11 drives forward exerting force on the plow 10 via the pins 14 and 16, thus drawing the plow forward. As the plow 10 is drawn forward, shear 20b displaces soil and thereby cuts a subsurface upon which the flexible pipe 18 is laid. Shank 20 displaces soil temporarily opening a trench through which said shank passes. The weight of soil upon and around the installed flexible pipe 34 holds the pipe in place causing flexible pipe 18 to continuously be drawn through the boot 20a as plow 10 progresses forward.

The path of cutting edge c of shear 20b thus determines the profile of the installed flexible pipe 34, and control of motion of cutting edge c primarily determines the profile of installed flexible pipe 34. Frame 17 being free to pivot about pin 14, the vertical component of motion of shank 20 is substantially determined by the forces of the soil impinging upon said shank's surfaces. It is to be appreciated that shank 20 rides on the surface of skid plate 20c and that the motion of the shank is approximately parallel to the orientation of the skid plate 20c due to forces exerted by adjacent soil impinging on surfaces of shank 20. When shank 20 is pivoted about pin 20d such that skid plate 20c is pointing downward, shank 20 follows a path of decreasing elevation. Similarly, when said shank is pivoted about the pin such that skid plate 20c is pointing upward, shank 20 follows a path of increasing elevation. Thus, shank 20 may be understood to be slicing through the ground in approximately the direction parallel to the surface of skid plate 20c.

Electronic control 25 incorporates a first sensor, which may be an inclinometer 56 which measures orientation relative to Earth's gravitational field. Electronic control 25 also incorporates a second sensor, which may be a GNS receiver 24. As will be explained in more detail below, first sensor 56 is adapted to sense a first parameter from which the elevation of cutting edge 20b can be derived and second sensor 24 is adapted to sense a second parameter from which the elevation of cutting edge 20b can be derived. The first and second parameters are redundant in that the elevation of cutting edge 20b can be independently determined from either of the parameters. As will be explained in more detail below, electronic control 25 is capable of determining the actual elevation of cutting edge 20b by combining the first and second parameters. Once the actual elevation of cutting edge 20b is determined, electronic control 25 compares the actual elevation with a desired elevation and controls hydraulic actuator 22 to move cutting edge 20b toward a desired elevation.

Electronic control 25 includes a control assembly 50 to govern the pitch orientation $\theta$ of the shank 20 and the skid plate 20c via hydraulic actuators 22 and thereby influences the direction of travel of the shank 20 and ultimately the depth and grade of the installed flexible pipe 34 (FIG. 2). In this manner, the pipe may be made to follow a desired flexible pipe profile 36 specified by digital design information 52. Control assembly 50 includes a computer, such as a microcomputer 54, which receives an input from sensor 56 to provide a first parameter in the form of pitch of the shank relative to the Earth. In the illustrated embodiment, sensor 56 is a two-axis model CXTLA clinometer, or slope sensor, with temperature compensation marketed by Crossbow Corporation, but inclinometers are supplied by various manufacturers. In another embodiment, sensor 56 may also detect roll of the shank. Sensor 56 could, alternatively, be a potentiometer or shaft encoder whose wiper is mechanically coupled to the shank 20 such that it provides a measurement of the pitch of said shank relative to frame 17. However, such embodiment would require sensing of information regarding orientation of frame 17 and thus be more complex.

Computer 54 receives an input from GNS receiver 24 to provide a second parameter in the form of position data, such as latitude, longitude, and elevation. GNS receiver 24 may receive signals from a plurality of global navigation satellites orbiting overhead. The satellites may belong to one of a known GNS system, such as GPS, GLONASS, GALILEO, or the like. In the illustrated embodiment, the GNS receiver 24 receives signals only from global navigation satellites and none from a reference station so that it may measure position data with three- to five-inch accuracy. The GNS receiver may be compatible with OmniSTAR HP service to provide such accuracy. In the illustrated embodiment, GNS receiver 24 is a Model AG252 receiver marketed by Trimble Corporation, but GNS receivers from various manufacturers may be used. However, it may be possible to use a signal from a reference station received by the GNS receiver 24 so that it may measure with approximately one-inch accuracy.

Figure 3:
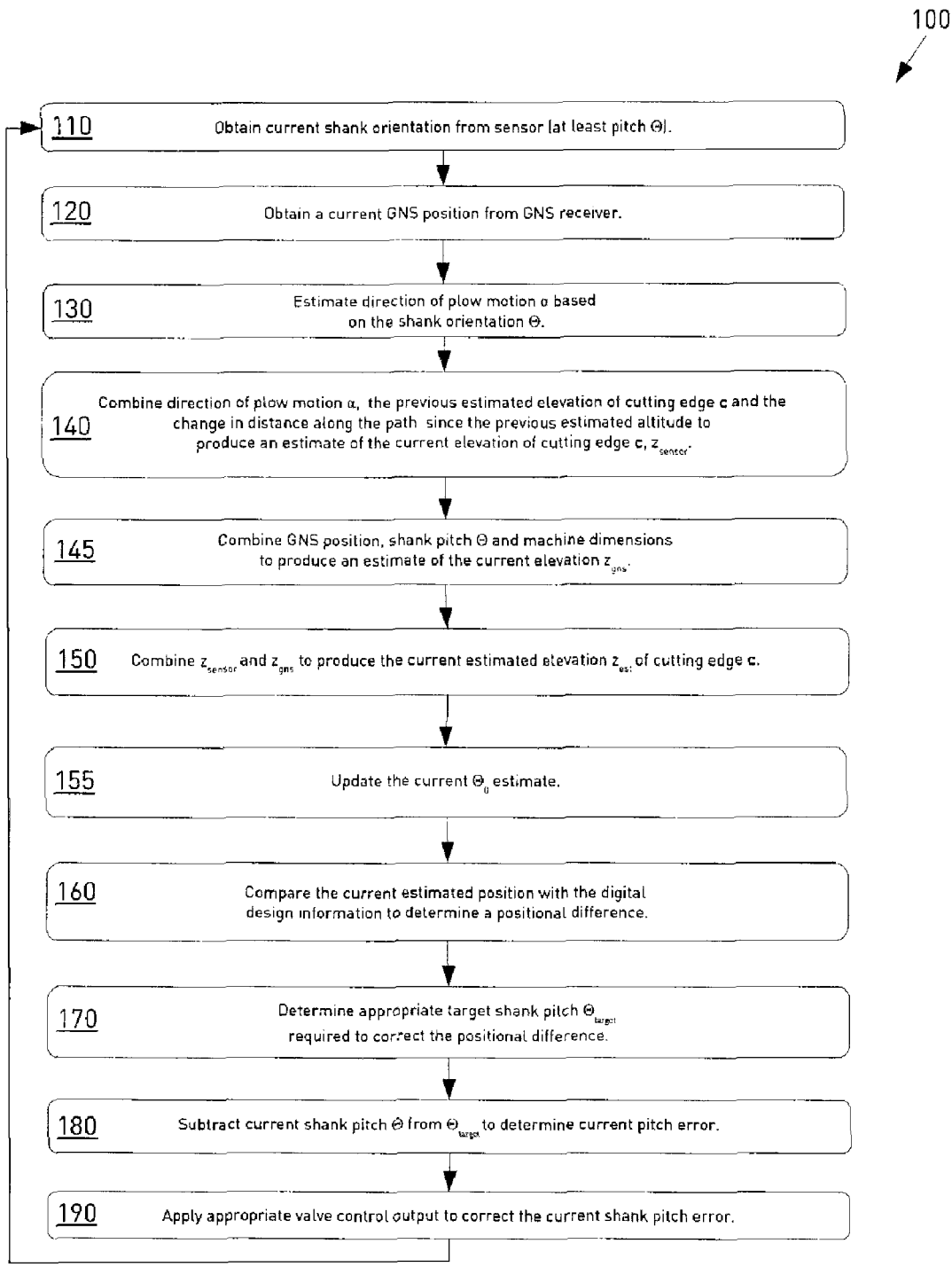
FIG. 3 is a flow chart of a control program.

Computer 54 includes a processor 70 and memory 72 for storing and executing a control program 100 in FIG. 3 to implement the present invention. Computer 54 includes appropriate input and output ports to communicate with sensor 56, GNS receiver 24, and valve control output 66 to activate and deactivate solenoid-operated hydraulic valve control assembly 32. A system user interface 68 may be situated proximate to the operator and tractor console 15 and provides a means for communicating with the computer 54.

Control assembly 50 provides output 66, which is coupled to the valve control assembly 32. Valve control assembly 32 can be any of several commercially available types and has a pair of work ports 60 and 62 connected to the lower and upper chambers of the cylinder 22 in order to extend or retract the cylinder. A pair of solenoids (not shown) are electrically operated by control line 66 from the control assembly 50. Activation of one of the solenoids applies hydraulic fluid under pressure from a pump (not shown) to a first cylinder chamber and drains fluid from a second cylinder chamber to the tank, thereby extending the piston of cylinder 22. Activation of the other solenoid of the hydraulic valve assembly 32 applies hydraulic fluid from the pump to the second cylinder chamber and drains it from the first chamber thereby retracting the piston of cylinder 22. Thus, by selectively actuating one of the solenoids, cylinder 22 can cause shank 20 to pivot about pin 20d, increasing or decreasing the shank pitch $\theta$ in FIG. 2. While illustrated with the plow, it should be understood that control valve assembly 32 may be incorporated with tractor 11 and commanded by control assembly 50, such as via a communication bus, such as an ISOBUS protocol. Also, various physical layouts and locations of control assembly 50 can be utilized.

Computer 54 may be programmed with digital design information 52 specifying the desired flexible pipe profile 36 may have any of at least three sources, depending on the operator's selection. First, the profile may be created as tile installation progresses by a subprogram (not shown) in response to user-entered desired grade. Second, the profile may be constructed by a subprogram (not shown) on the computer 54 prior to installation of flexible pipe 18 based on a survey of the ground profile by driving over the ground where tile is to be installed. Third, the profile may be designed on a remote computer (not shown) and stored on removable medium 74 and loaded into computer 54 or may be transferred wirelessly to computer 54.

Figure 4:
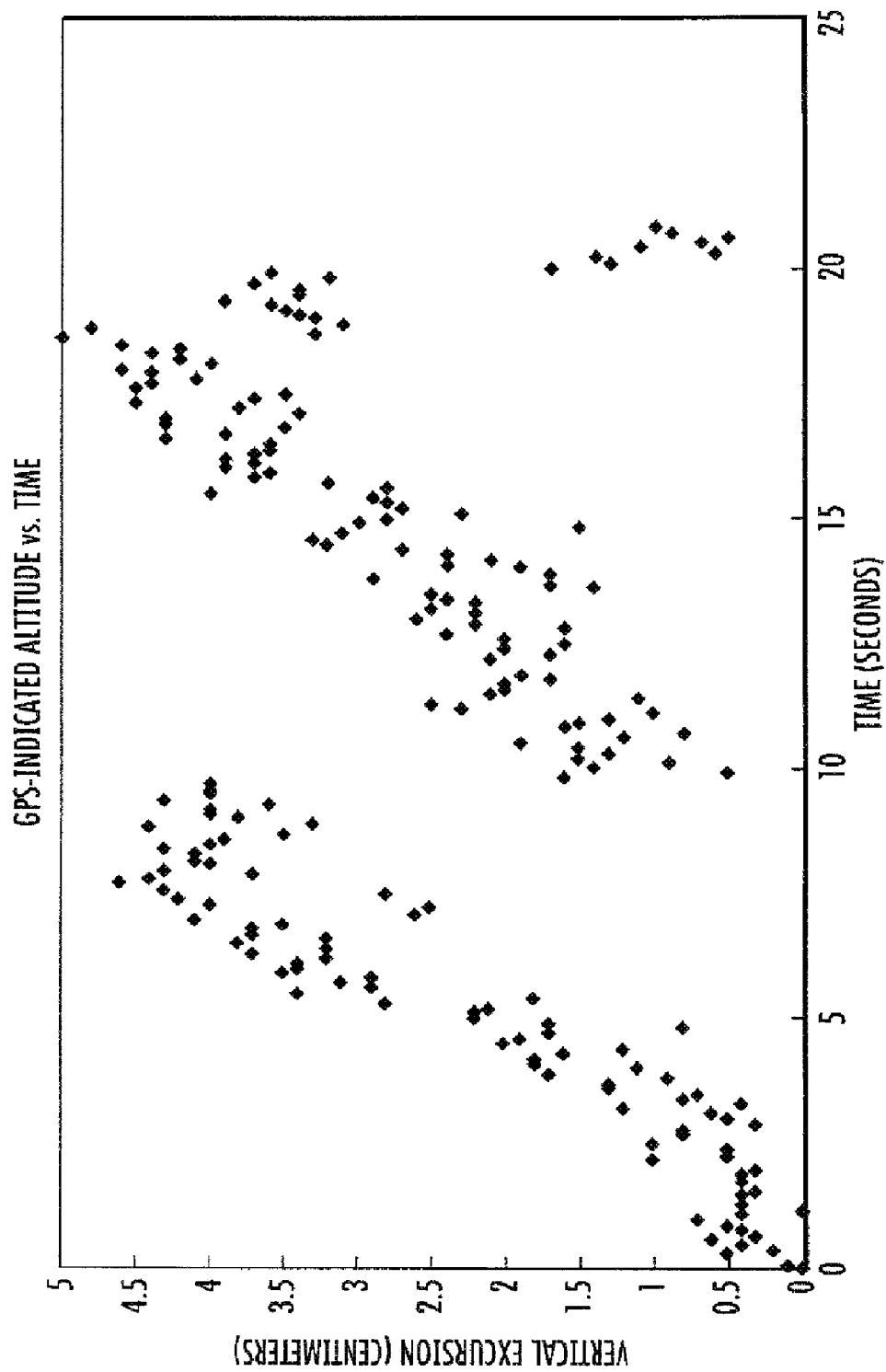
FIG. 4 is a chart illustration operation of a conventional GNS receiver.
Figure 5:
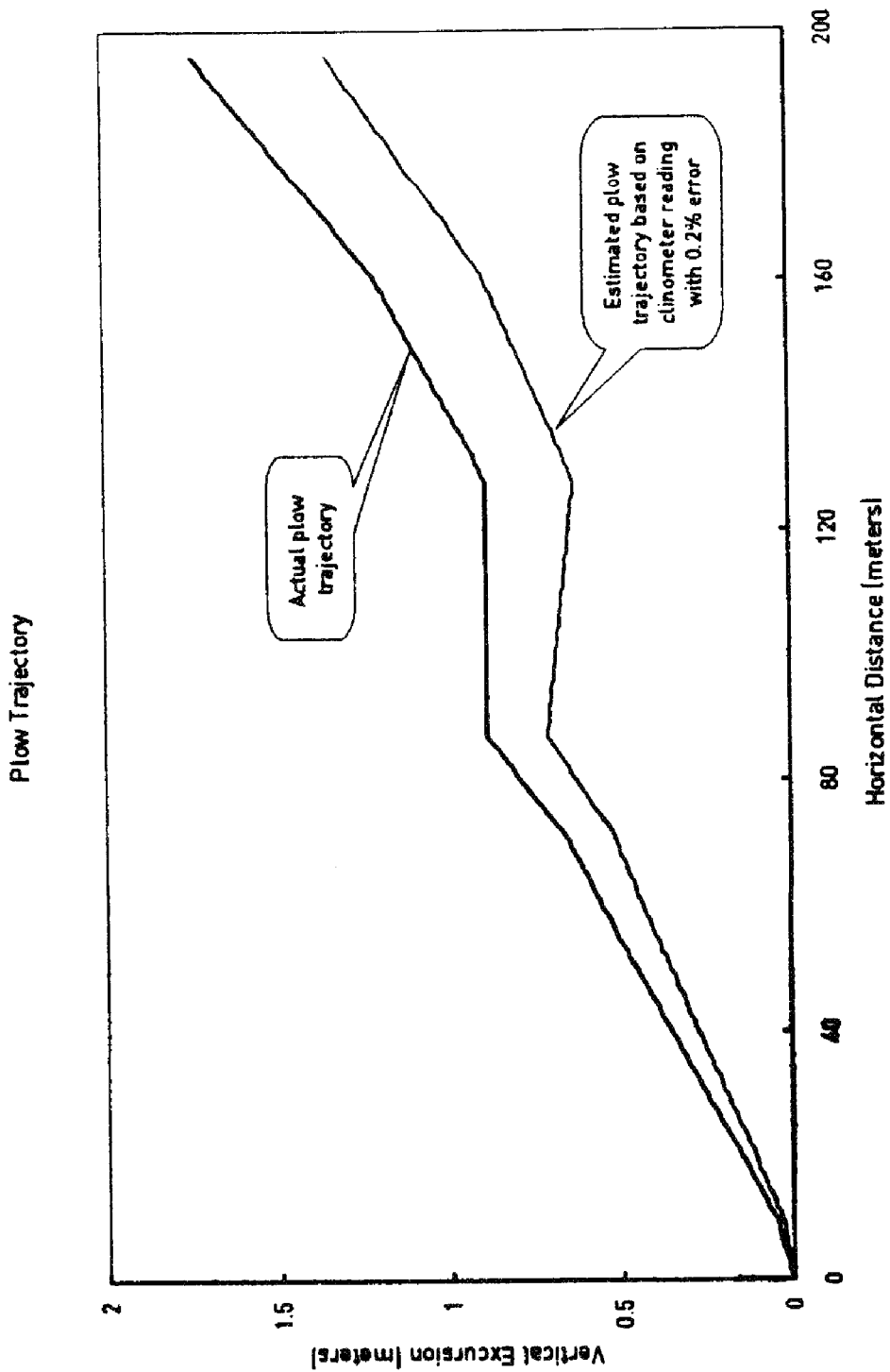
FIG. 5 is a chart illustrating accumulation of error in elevation computed with a conventional clinometer with respect to distance traveled.

Having provided the digital design information 52, the operator commands the computer 54 to execute a control program 100, shown in FIG. 3. In program 100, the electronic control combines the first and second parameters according to a weighted function. The weighted function tends to apply high-pass filtering to the second parameter which is produced by clinometer 56. The weighted function tends to apply low-pass filtering to the first parameter produced by the GNS receiver. As can be seen by reference to FIGS. 4 and 5, the GNS receiver does not tend to accumulate error, but is subject to noise, whereas the inclinometer tends to accumulate error, or drift, over time. The effect of the weighted function carried out by control program 100 is to use information in the signal obtained from the inclinometer to reject the noise in the GNS receiver. The second parameter takes time to average into the first parameter.

Control program 100 produces signals on control line 66 to effect shank pitch $\theta$ adjustment of the shank 20 so as to influence the direction of motion of shear 20b and ultimately the path of installed flexible pipe 34. In step 110, computer 54 obtains the measurement of the current shank spatial orientation consisting of at least the pitch relative to earth $\theta$ from sensor 56. In another embodiment the measurement of the shank spatial orientation consists of the current shank pitch $\theta$ and a current shank roll relative to earth. In step 120, control assembly 50 is programmed to retrieve the current GNS position (comprising easting, northing and elevation) from GNS receiver 24. In step 130, computer 54 computes an angle $\alpha$ between a horizontal e and a velocity vector b of the cutting edge c, depicted in FIG. 2. In one embodiment, $\alpha$ is computed according to the formula $\alpha = \theta - \theta_0$. The angle $\theta_0$ is a value of $\theta$ for which the plow shank 20 is observed to progress forward while experiencing no change in elevation. In other words, $\theta_0$ is a calibration parameter representing the pitch $\theta$ of shank 20 that causes said shank to travel forward horizontally, neither gaining nor losing elevation.

The angle $\theta_0$ may be expected to be roughly zero, but the precise value may be determined after the sensor 54 has been mounted to the plow and will depend upon the circumstance and manner of mounting and manufacturing tolerances of the involved mechanical features, such as bolt hole sizes and locations and characteristics of sensor 54 interfacing electrical components. The angle $\theta_0$ may be determined initially using an iterative process and may be updated periodically by using the process set forth in step 155, as will be described in more detail below.

In step 130 in another embodiment, computer 54 computes a by taking the difference $\theta - \theta_0$ and determining a from a lookup table. In such an embodiment, the lookup table may be ascertained by logging histories of $\alpha$ and $\theta$ while operating the plow at fixed values of $\alpha$, and computing average values of $\theta$.

In step 140, computer 54 computes $z_{sensor}$, an estimate of the elevation of the cutting edge c according to the formula: $z_{sensor} = z_{est}$ change in elevation where $z_{est}$ was computed in the most recent execution of step 160 discussed below. The change in elevation is computed using the trigonometric relationship between the distance traveled and $\alpha$: change in elevation=distance traveled*tangent ($\alpha$). The distance traveled is the distance between the current GNS position reported by GNS receiver 24 and GNS position at the time of the most recent previous performance of step 140. The first time step 140 is performed there is no previous performance of step 140 and the distance traveled is assigned zero.

In step 145, computer 54 computes the current position of the cutting edge c comprising easting $x_{gns}$, northing $y_{gns}$ and elevation $z_{gns}$. The current position c is computed using vector arithmetic by adding a displacement vector a (FIG. 2) to the current GNS position reported by the GNS receiver 24. The displacement vector a is readily determined from the machine dimensions of shank 20, spatial orientation of shank 20, and the mounting location of the GNS receiver 24. In another embodiment, the cutting edge c may be approximated as the current position of the GNS receiver 24 minus the vertical component of vector a.

In step 150, the computer 54 is programmed to combine $z_{sensor}$ and $z_{gns}$ to produce the estimated elevation of cutting edge c using the formula $z_{est} = (1.0-w)*z_{sensor} + w*z_{gns}$ where w is a predetermined weighting factor between 0 and 1. Note that $z_{sensor}$ and $z_{gns}$ are substantially independently computed estimates of the current elevation of cutting edge c and that by choosing a value of w much closer to zero than one, the high-frequency noise present in the elevation signal of the GNS receiver 24 is attenuated, whereas the low-frequency noise present in the sensor-derived estimate $z_{sensor}$ is attenuated. In other words, combining the signals from the sensor 56 and GNS receiver 24 according to the disclosed embodiments produces an elevation estimate more accurate than either could produce alone. It is further to be appreciated that this improvement in elevation estimation accuracy makes possible the use of GNS systems of lower accuracy, such as those not requiring a base station, for machine control.

In step 155, computer 54 adjusts calibration parameter $\theta_0$ used in step 130. The calibration parameter defines an orientation, or pitch, of shank 20 at which the plow does not substantially rise or fall while moving horizontally. This may be considered a neutral orientation. In the illustrated embodiment, the calibration parameter $\theta_0$ is computed by low-pass filtering an instantaneous implied value. The instantaneous implied value is equal to the instantaneous implied a minus shank pitch $\theta$ of the second sensor. The instantaneous implied $\alpha$ is computed as the arctangent (change in $z_{gns}$/distance travelled) where the change in $z_{gns}$ and distance travelled are computed from the most recent and previous GNS locations and elevations received from the first sensor. No adjustment to $\theta_0$ is made when there is no forward motion of the plow as determined when distance travelled is zero or less than some small threshold. Since a stationary plow does not generate information informing the adjustment of $\Theta_0$, $\Theta_0$ may be continually updated as described here. Alternatively, the value so produced may be stored and displayed, and the operator may manually adjust the $\theta_0$ which is ultimately used in step 130.

A rationale for adjusting $\theta_0$ as described above is as follows. $\Theta_0$ is meant to denote the pitch $\Theta$ at which the plow progresses forward in a level manner, neither rising nor falling, as implied by the relationship $\alpha=\Theta-\Theta_0$: when $\Theta=\Theta_0$ direction of motion $\alpha$ is zero and the plow runs level. Step 155 computes the implied instantaneous value of $\Theta_0$ using this relationship, measurement of $\Theta$ and $\alpha$ implied by GNS measurements are provided by the first sensor. While $z_{gns}$ and pitch measurement may in fact contain mathematical noise, the noise has a zero mean so that the cumulative effect of many small adjustments averaged together by the low-pass filter substantially eliminates said noise.

A possibly large number of iterations of step 155 may be required before $\theta_0$ will converge to a value, and provision for this convergence can be made in the instructions provided to operators of the control assembly 50. In another embodiment, $\theta_0$ may be entered manually by the operator using the operator interface 68, and no adjustment made in step 155. In still another embodiment, $\theta_0$ may be computed by a Kalman filter (not shown) in a manner that would be apparent to the skilled artisan.

In step 160 computer 54 compares the current position of the cutting edge c with the digital design information 52 stored in memory 72 of the computer 54 to determine a positional difference between the current position of the cutting edge c and a desired position of the cutting edge as indicated by the digital design information 52 for a given point along the desired flexible pipe profile 36.

In step 170, the computer determines a desired pitch orientation $\Theta_{target}$ of shank 20 that will cause said shank to move in a direction restoring it to the desired flexible pipe profile 36. More particularly, a $\Theta_{target}$ is chosen that will compensate the positional error computed in step 160 by producing an $\alpha$ according to a proportional control law. In other words, $\Theta_{target}$ will be chosen to produce a that is positive (pointing up) when cutting edge c is below desired flexible pipe profile 36 and to produce a negative $\alpha$ (pointing down) when cutting edge c is above the desired flexible profile. In an another embodiment, $\Theta_{target}$ is chosen to point the velocity vector b at a point on the desired flexible profile 36 at a predetermined distance ahead of the current position along said profile. In yet another embodiment, the predetermined distance is adjusted to be shorter when the positional error is greater and vice versa. Other embodiments may employ any of a large number of possible control laws explored in the control theory literature. In yet another embodiment, a start compensation pitch may be superimposed on $\Theta_{target}$ to counteract the tendency of the plow dip at the very start of an installation run as the plow bites the ground. For example, the start compensation pitch may start at an operator-editable value defaulting to 2% grade, and linearly tapers to zero over the first 2 meters of the installation run. This temporary extra upward pitch tends to offset the said tendency of the plow to dip at the start of an installation run.

In step 180, the computer determines a current pitch error by subtracting the current shank pitch $\theta$ from the current desired pitch orientation $\Theta_{target}$. In step 190, the computer sends an appropriate adjustment signal to the valve controller 34 via control line 66 to compensate the current pitch error, thereby adjusting the positioning of hydraulic cylinders 22. In this way, the shank pitch $\theta$ is adjusted to follow the desired pitch $\Theta_{target}$ as closely as possible.

Those skilled in the art of feedback control theory will see alternative strategies involving Kalman filtering, classical, adaptive, optimal, multivariable linear and nonlinear control laws and parameter estimation techniques, fuzzy logic, neural networks, or support vector machines which may be substituted for portions of the program 100 presented in FIG. 3 without departing from the spirit of the invention.

Changes and modifications in the specifically described embodiments can be carried out without departing from the principles of the invention. The invention is intended to be limited only by the scope of the appended claims, as interpreted according to the principles of patent law including the doctrine of equivalents.

The embodiments of the invention in which an exclusive property or privilege is claimed are defined as follows:

1. A drainage plow control for controlling elevation of a drainage plow having a frame that is adapted to connect to a prime mover, a shank that is connected to the frame, and a hydraulic actuator that is adapted to adjust pitch of said shank relative to earth, said shank defining a cutting edge, wherein the pitch of said shank relative to earth causes a change in the elevation of said cutting edge, said drainage plow control comprising:

an electronic control and a hydraulic valve assembly, said hydraulic valve assembly adapted to be connected with the hydraulic actuator to adjust pitch of the shank, said electronic control being adapted to activate said hydraulic valve assembly;

wherein said electronic control comprises a processor and at least one sensor, said at least one sensor adapted to be positioned on the drainage plow and comprising a GNS receiver that is adapted to measure current elevation relative to earth and to provide a GNS location input to said processor, said at least one sensor further comprising an inclinometer that is adapted to measure current pitch relative to earth and to provide a current pitch input to said processor, wherein said processor activates said hydraulic valve assembly from said inputs in a manner that adjusts the hydraulic actuator to affect the pitch of the shank relative to earth, wherein said electronic control combines the GNS location input, the current pitch input and a desired elevation of said cutting edge relative to earth to provide a valve control output and wherein said electronic control activates said hydraulic valve assembly as a function of the valve control output.

2. The drainage plow control as claimed in claim 1 wherein said processor combines the GNS location input and a desired elevation of said cutting edge relative to earth to provide a desired pitch of said shank and wherein said processor combines the desired pitch of said shank with the current pitch input to provide the valve control output.

3. The drainage plow control as claimed in claim 2 wherein said processor combines the GNS location input with the desired elevation of said cutting edge relative to earth to provide an elevation error value and determines the desired pitch of said shank from the elevation error value.

4. The drainage plow control as claimed in claim 1 wherein said GNS receiver has an accuracy that is no better than 2 inches.

5. The drainage plow control as claimed in claim 4 wherein said GNS receiver has an accuracy that is no better than 5 inches.

6. The drainage plow control as claimed in claim 1 wherein said inclinometer is a multiple-axis inclinometer that is further adapted to measure roll of the shank relative to earth.

7. The drainage plow control as claimed in claim 1 wherein said processor is adapted to determine a calibration parameter, said calibration parameter defining a pitch of the shank relative to earth at which said edge does not substantially change in elevation.

8. The drainage plow control as claimed in claim 7 wherein said processor is adapted to determine the calibration parameter from the GNS location input and the current pitch input.

9. The drainage plow control as claimed in claim 7 wherein said processor is adapted to determine the calibration parameter during a calibration procedure prior to operation of the drainage plow.

10. The drainage plow control as claimed in claim 7 wherein said processor is adapted to repetitively update the calibration parameter during operation of the drainage plow.

11. The drainage plow control as claimed in claim 1 wherein said processor is adapted to access a desired drainage pipe profile to obtain the desired elevation.

12. A method of controlling the elevation of a cutting edge of a drainage plow, said drainage plow having a frame that is adapted to connect to a prime mover, a shank that is connected to said frame and a hydraulic actuator that is adapted to adjust pitch of said shank relative to earth, said shank defining a cutting edge, wherein the pitch of said shank relative to earth causes a change in the elevation of said cutting edge, said method comprising:

positioning at least one sensor on the drainage plow, said at least one sensor comprising a GNS receiver and an inclinometer, measuring current elevation of said cutting edge relative to earth with said GNS receiver and current pitch of said shank relative to earth with said inclinometer;

providing the current elevation of said cutting edge relative to earth and the pitch of said shank relative to earth to a processor and combining the current elevation of said cutting edge relative to earth, a desired elevation of said cutting edge relative to earth and current pitch of said shank relative to earth using said processor to provide a valve control output; and supplying the valve control output to a hydraulic valve assembly connected with said hydraulic actuator and activating said hydraulic valve assembly with the valve control output of said processor.

13. The method as claimed in claim 12 including combining the GNS location input and a desired elevation of said cutting edge relative to earth to provide a desired pitch of said shank and combining the desired pitch of said shank with the current pitch input to provide the valve control output.

14. The method as claimed in claim 13 including combining the GNS location input with the desired elevation of said cutting edge relative to earth to provide an elevation error value and determining the desired pitch of said shank from the elevation error value.

15. The method as claimed in claim 12 wherein said GNS receiver has an accuracy that is no better than 2 inches.

16. The method as claimed in claim 15 wherein said GNS receiver has an accuracy that is no better than 5 inches.

17. The method as claimed in claim 12 wherein said inclinometer is a multiple-axis inclinometer and further including measuring roll of the shank relative to earth.

18. The method as claimed in claim 12 including determining a calibration parameter using said processor, the calibration parameter defining a pitch of the shank relative to earth at which said edge does not substantially change in elevation.

19. The method as claimed in claim 18 including determining the calibration parameter using said processor from the measured current elevation of said cutting edge relative to earth and current pitch of said shank relative to earth.

20. The method as claimed in claim 18 including determining the calibration parameter using said processor during a calibration procedure prior to operation of the drainage plow.

21. The method as claimed in claim 18 including repetitively updating the calibration parameter using said processor during operation of the drainage plow.

22. The method as claimed in claim 12 wherein said processor accesses a desired drainage pipe profile to obtain the desired elevation.

23. A drainage plow, comprising:

a frame that is adapted to connect to a prime mover;

a shank that is connected to, the frame;

a hydraulic actuator that is adapted to adjust pitch of said shank relative to earth, said shank defining a cutting edge, wherein the pitch of said shank relative to earth causes a change in the elevation of said cutting edge; and a drainage plow control comprising an electronic control and a hydraulic valve assembly, said hydraulic valve assembly adapted to be connected with said hydraulic actuator to adjust pitch of the shank, said electronic control being adapted to activate said hydraulic valve assembly;

wherein said electronic control comprises a processor and at least one sensor, said at least one sensor comprising a GNS receiver that is adapted to measure current elevation relative to earth and to provide a GNS location input to said processor, said at least one sensor further comprising an inclinometer that is adapted to measure current pitch of said shank relative to earth and to provide a current pitch input to said processor, wherein said processor activates said hydraulic valve assembly from said inputs in a manner that adjusts said hydraulic actuator to affect the pitch of said shank relative to earth, wherein said electronic control combines the GNS location input, the current pitch input and a desired elevation of said cutting edge relative to earth to provide a valve control output and wherein said electronic control activates said hydraulic valve assembly as a function of the valve control output.

* * * * *